(12) United States Patent
Fujita et al.

(10) Patent No.: US 9,022,470 B2
(45) Date of Patent: May 5, 2015

(54) CHILD CAR SEAT

(71) Applicant: Combi Corporation, Tokyo-to (JP)

(72) Inventors: Morihiko Fujita, Saitama (JP); Noriyuki Osaka, Saitama (JP)

(73) Assignee: Combi Corporation, Tokyo-to (JP)

( * ) Notice: Subject to any disclaimer, the term of this patent is extended or adjusted under 35 U.S.C. 154(b) by 59 days.

(21) Appl. No.: 13/733,570

(22) Filed: Jan. 3, 2013

(65) Prior Publication Data
US 2013/0175835 A1    Jul. 11, 2013

(30) Foreign Application Priority Data
Jan. 6, 2012 (JP) .................................. 2012-001461

(51) Int. Cl.
B60N 2/60    (2006.01)
B60N 2/28    (2006.01)
B60N 2/26    (2006.01)

(52) U.S. Cl.
CPC ...... *B60N 2/265* (2013.01); *B60N 2/60* (2013.01); *B60N 2/2812* (2013.01); *B60N 2/2851* (2013.01)

(58) Field of Classification Search
USPC .......................................... 297/250.1, 219.2
See application file for complete search history.

(56) References Cited

U.S. PATENT DOCUMENTS

| 6,155,638 | A  | * | 12/2000 | Bapst ........................... 297/250.1 |
| 6,491,348 | B1 |   | 12/2002 | Kain |
| 7,637,568 | B2 | * | 12/2009 | Meeker et al. ............. 297/250.1 |
| 7,901,003 | B2 | * | 3/2011  | Meeker et al. ............. 297/250.1 |
| 8,177,303 | B2 | * | 5/2012  | Chen et al. ..................... 297/484 |
| 2002/0145318 | A1 |   | 10/2002 | Asbach et al. |
| 2003/0193225 | A1 | * | 10/2003 | Kain ........................... 297/250.1 |
| 2004/0217636 | A1 | * | 11/2004 | Sedlack ...................... 297/250.1 |
| 2012/0313413 | A1 | * | 12/2012 | Hutchinson et al. ........ 297/250.1 |

FOREIGN PATENT DOCUMENTS

| DE | 10 2007 043 020 A1 | 3/2009 |
| JP | 2002-362201 A | 12/2002 |
| JP | 2007-143835 A | 6/2007 |

* cited by examiner

*Primary Examiner* — David R Dunn
*Assistant Examiner* — Timothy J Brindley
(74) *Attorney, Agent, or Firm* — Birch, Stewart, Kolasch & Birch, LLP

(57) ABSTRACT

A child car seat (10) includes a child-car-seat body (15) includes a seat part (40) having a seat plate part (41) and a back plate part (45), a sliding member (60) located on a position opposed to the back plate part from a front side, the sliding member being slidable with respect to the back plate part so as to move in a height direction, and a child belt disposed on the child car-seat body. The sliding member (60) has a through-hole (66) through which the child belt (30) can pass. The back plate part has, at a position opposed to the through-hole, an elongate hole (66) extending in a sliding direction of the sliding member with respect to the back plate part.

10 Claims, 9 Drawing Sheets

CHILD CAR SEAT

CROSS REFERENCE TO RELATED APPLICATION

This application is based upon and claims the benefit of priority from the prior Japanese Patent Application No. 2012-001461 filed on Jan. 6, 2012, the entire contents of which are incorporated herein by reference.

FIELD OF THE INVENTION

The present invention relates to a child car seat on which a child is seated. More particularly, the present invention relates to a child car seat including a child belt for fixing a child.

BACKGROUND ART

As disclosed in JP2002-362201A and JP2007-143835A, for example, a child car seat that is fixed on a seat of a vehicle by means of a vehicle seatbelt is generally known as a child car seat having a child belt for fixing a child. The child belt includes a crotch belt passing through between thighs of a child, and shoulder belts extending on shoulders. A plurality of through-holes through which the shoulder belt can pass are formed in a back part of the child car seat at different positions in a height direction. By suitably selecting a through-hole through which the shoulder belt passes, a support position of the child belt can be adjusted correspondingly to a growth step of a child.

However, in the child car seats of JP2002-362201A and JP2007-143835A, when one intends to pass the shoulder belt through another through-hole, he/she should carry out a complicated operation such as removal of an end portion of the child belt from a metal piece or a buckle. Namely, in the child car seats of JP2002-62201A and JP2007-143835A, it is not easy to adjust a position of the child belt.

DISCLOSURE OF THE INVENTION

The present invention has been made in view of the above circumstances. The object of the present invention is to provide a child car seat in which a position of a child belt can be easily adjusted.

A child car seat according to the present invention is a child car seat comprising:

a child-car-seat body including a seat part having a seat plate part and a back plate part;

a sliding member located on a position opposed to the back plate part from a front side, the sliding member being slidable with respect to the back plate part so as to move in a height direction; and a child belt disposed on the child-car-seat body;

wherein:

the sliding member has a through-hole through which the child belt can pass; and the back plate part has, at a position opposed to the through-hole, an elongate hole extending in a sliding direction of the sliding member with respect to the back plate part, the elongate hole allowing the child belt, which has passed through the through hole of the sliding member, to pass therethrough.

In the child car seat according to the present invention, the sliding member may constitute a headrest.

In the child car seat according to the present invention, at least one of the through-hole and the elongate hole may include a pair of holes that are spaced apart from each other in a width direction.

The child car seat according to the present invention may further include further comprising a fixing device joined to the sliding member through the elongate hole of the back plate part, such that the back plate part is sandwiched between the fixing device and the sliding member, wherein the fixing device is slidable, together with the sliding member, with respect to the back plate part.

In the child car seat according to the present invention, the elongate hole may include a pair of elongate holes that are spaced apart from each other in a width direction; and the fixing device may extend in the width direction and may be joined to the sliding member through both of the elongate holes.

In the child car seat according to the present invention, one of the sliding member and the seat part may include a pair of engagement parts that are spaced apart from each other in a width direction, each engagement part extending in the sliding direction of the sliding member with respect to the back plate part;

the other of the sliding member and the seat part may include a pair of engagement pieces that are spaced apart from each other in the width direction, the engagement pieces being capable of moving away from each other and moving closer to each other; and a sliding movement of the sliding member with respect to the back plate part may be restricted, by engaging the engagement piece with the engagement part.

In such a child car seat according to the present invention, the pair of engagement parts may be disposed on the back plate part; the pair of engagement pieces may be disposed on the sliding member; and the pair of engagement pieces may be engaged with the engagement parts located on positions opposed to the respective engagement pieces from outside in the width direction, when the engagement pieces are moved away from each other outward in the width direction.

Alternatively, in the child car seat according to the present invention, one of the sliding member and the seat part may have an engagement part extending in the sliding direction of the sliding member with respect to the back plate part;

the other of the sliding member and the seat part may have an engagement piece at a position opposed to the engagement part, the engagement piece being supported to be capable of moving closer to and moving away from the one of the sliding member and the seat part; and a sliding movement of the sliding member with respect to the back plate part may be restricted, by engaging the engagement piece with the engagement part.

In such a child car seat according to the present invention, the elongate hole may include a pair of elongate holes disposed in the back plate part, the elongate holes being spaced apart from each other in a width direction; and the engagement part may be located on a position between the pair of elongate holes of the back plate part in the width direction.

Alternatively, in the child car seat according to the present invention, a pair of first engagement parts that are spaced apart from each other in a width direction may be disposed on the sliding member or the seat part, each engagement part extending in the sliding direction of the sliding member with respect to the back plate part, and a pair of first engagement pieces that are spaced apart from each other in the width direction are disposed on one of the sliding member and the seat part on which the first engagement parts are not disposed, the first engagement pieces being capable of moving away from each other and moving closer to each other;

a second engagement part extending in the sliding direction of the sliding member with respect to the back plate part may be disposed on the sliding member or the seat part, and a second engagement piece is disposed, at a position opposed to the second engagement part, on one of the sliding member and the seat part on which the second engagement part is not disposed, the second engagement piece being supported to be capable of moving closer to and moving away from one of the sliding member and the seat part on which the second engagement part is disposed; and a sliding movement of the sliding member with respect to the back plate part may be enabled, by releasing an engagement between the first engagement piece and the first engagement part and by releasing an engagement between the second engagement piece and the second engagement part.

The child car seat according to the present invention may further include an operation member disposed on the sliding member, the operation member being slidable with respect to the sliding member along the sliding direction of the sliding member with respect to the back plate part, wherein a sliding movement of the sliding member with respect to the back plate part may be enabled, by sliding the operation member with respect to the sliding member.

In the child car seat according to the present invention, the operation member is arranged between the sliding member and the back plate part, and the operation member may have a gripping part exposed from the sliding member.

The child car seat according to the present invention may further include a cover member for seat to be set on the seat part, wherein: an opening may be formed in the cover member for seat, at a position opposed to the back plate part from the front side; and the sliding member may be passed through the opening.

According to the present invention, a position of the child belt provided on the child car seat can be easily adjusted.

DETAILED DESCRIPTION OF THE INVENTION

Figure 1:
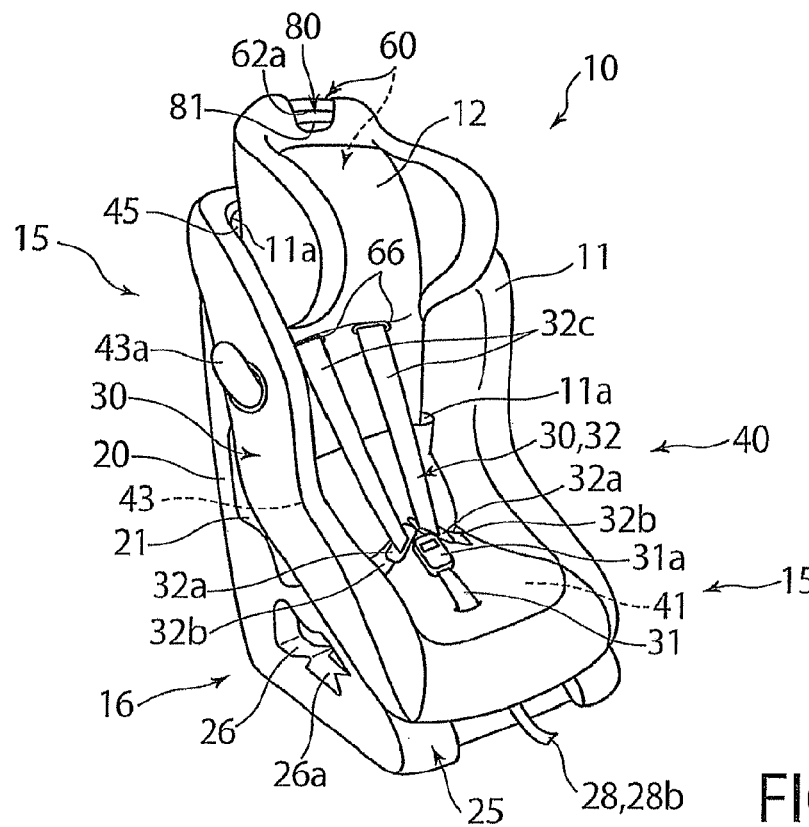
FIG. 1 is a perspective view showing a child car seat with a headrest being raised, for explaining an embodiment of the present invention.

An embodiment of the present invention is described hereblow with reference to the drawings. FIGS. 1 to 14 are views for explaining one embodiment of the present invention. The illustrated child car seat 10 according to this embodiment is located on a seat 5 of a vehicle, e.g., an automobile, so as to be used. The child car seat 10 is an apparatus for safely letting a child (such as an infant or a baby) to ride thereon in a vehicle including a seat (vehicle seat 5) and a seatbelt 7 that are designed for an adult. The child car seat 10 explained herein can be mounted on the seat 5 in a "forward-facing condition" in which a child seated on a seat part 40 faces forward of the car, which is shown in FIG. 4, and in a "rearward-facing condition" in which the child seated on the seat part 40 faces rearward of the car, which is shown in FIG. 5.

Figure 4:
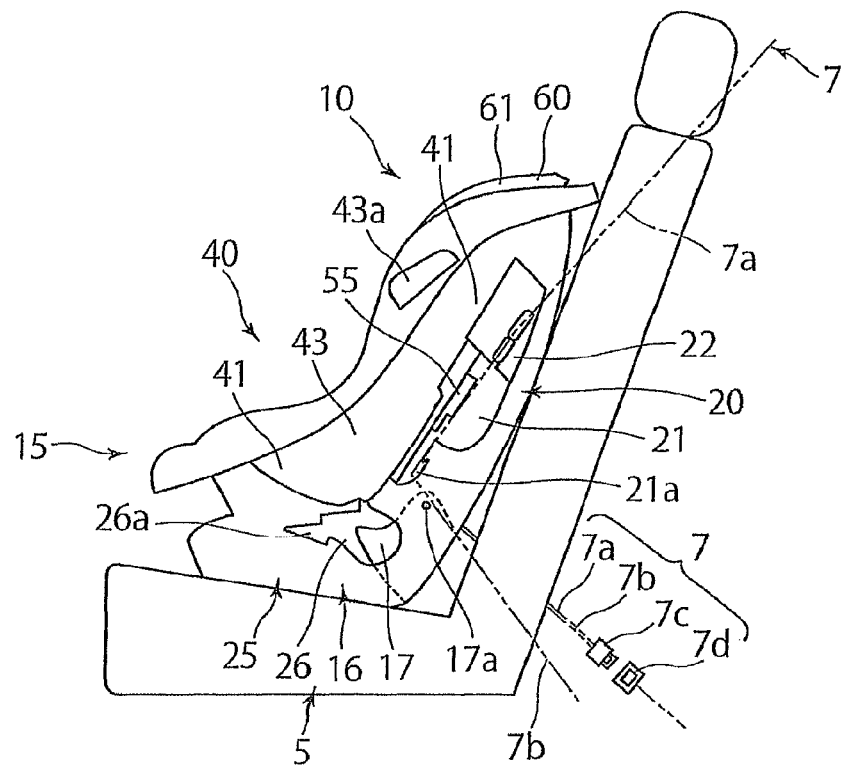
FIG. 4 is a side view showing that the child car seat in FIG. 1 is located on a seat of a vehicle.
Figure 5:
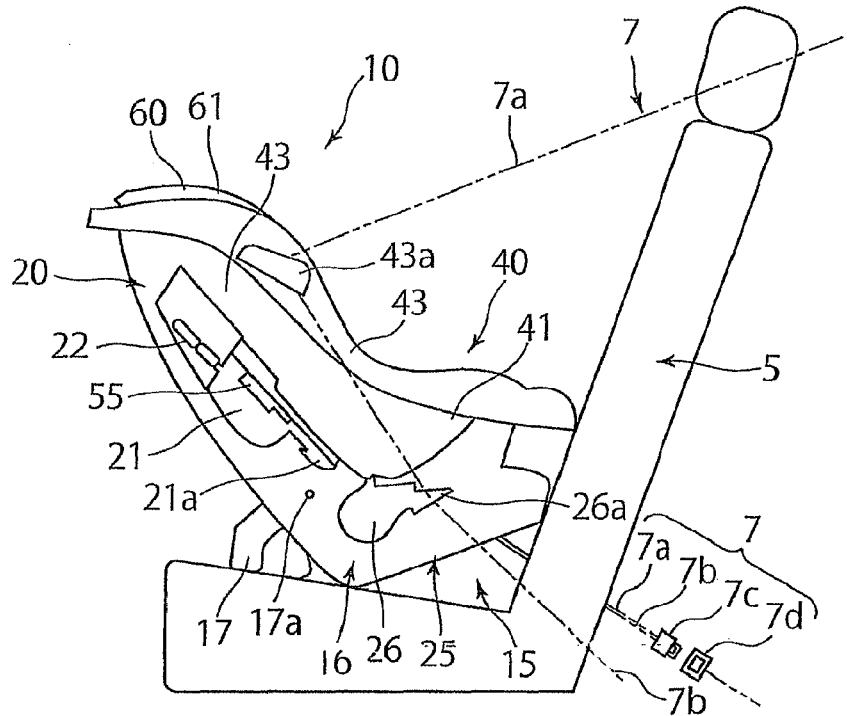
FIG. 5 is a side view showing that the child car seat in FIG. 1 is located on the seat of the vehicle in a manner different from that of FIG. 4.
Figure 6:
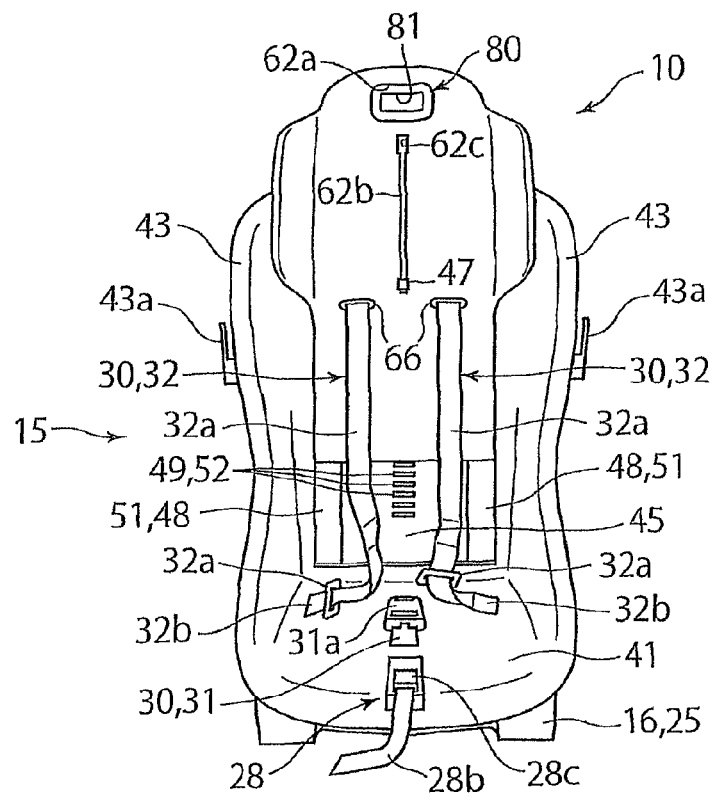
FIG. 6 is a front view showing the child car seat in FIG. 1 from which a cover member is removed, with a sliding member constituting the headrest being raised.

In this specification, the terms "front", "rear (back)", "right", "left", "lateral", "up" and "down" used for the child car seat 10 and its constituent elements mean, unless otherwise specified, "front", "rear", "right", "left", "lateral", "up" and "down", with respect to a child seated on the child car seat 10 in the forward-facing condition shown in FIG. 4, respectively. A "width direction" of the child car seat 10 and its constituent elements means a direction connecting the "left" and "right", i.e., the "lateral direction". A "height direction" of the child car seat 10 and its constituent elements mean the "up and down direction". Further, a "back and fourth" direction of the child car seat 10 and its constituent elements means a direction connecting the "front" and the "back". In the illustrated example, the "back and front" direction corresponds to the "back and front direction" or the "traveling direction" of the vehicle.

As shown in the attached drawings, the child car seat 10 includes a child-car-seat body 15 having a seat part (seat body) 40 composed of a seat plate part 41 and a back plate part 45, a sliding member 60 located on a position opposed to the back plate part 45 from the front side, and a child belt 30 disposed on the child-car-seat body 15. The sliding member 60 can be slid with respect to the back plate part 45 so as to be movable in the height direction. The sliding member 60 has a through-hole 66 through which the child belt 30 can pass. At a position opposed to the through-hole 66 of the back plate part 45, there is formed an elongate hole 46 extending in a direction in which the sliding member 60 slides (sliding direction of the sliding member 60) with respect to the back plate part 45. The child belt 30 having passed through the through-hole 66 of the sliding member 60 also passes through the elongate hole 46.

In such a child car seat 10, by sliding the sliding member 60 with respect to the child-car-seat body 15 so as to vary the height direction of the sliding member 60, a position at which the child belt 30 is supported can be varied. Thus, in this child car seat 10, it is significantly easy to adjust a position of the child belt 30, correspondingly to the growth stage of a child. Particularly in this embodiment, the sliding member 60 is constituted as a headrest for receiving a head of a child seated on the child car seat 10. Thus, depending on a position of a head of a child, it is possible to adjust a position at which shoulder belts 32c of the child belt 30 is supported.

As described in detail below, a first engagement part 51, which extends in the sliding direction of the sliding member 60 with respect to the back plate part 45, is disposed on one of the sliding member 60 and the back plate part 45, and a first engagement piece 71, which is capable of being engaged with the first engagement part 51, is disposed on the other on which the first engagement part 51 is not disposed. In addition, a second engagement part 52, which extends in the sliding direction of the sliding member 60 with respect to the back plate part 45, is disposed on one of the sliding member 60 and the back plate part 45, and a second engagement piece 72, which is capable of being engaged with the second engagement part 52, is disposed on the other on which the second engagement member 52 is not disposed. Due to at least one of the engagement between the first engagement part 51 and the first engagement piece 71 and the engagement between the second engagement part 52 and the second engagement piece 72, the sliding movement of the sliding member 60 with respect to the back plate part 45 is restricted. On the other hand, when the engagement between the first engagement part 51 and the first engagement piece 71 is released and the engagement between the second engagement part 52 and the second engagement piece 72 is released, the sliding movement of the sliding member 60 with respect to the back plate part 45 is enabled.

The child car seat 10 is provided with an operation member 80 for operating the engagement and the disengagement between the first engagement part 51 and the first engagement piece 71, and the engagement and the disengagement between the second engagement part 52 and the second engagement piece 72. The operation member 80 is disposed between the sliding member 60 and the back plate part 45 of the seat part 40. The operation member 80 is supported, by the sliding member 60, slidably with respect to the sliding member 60.

Further, in the illustrated example, a fixing device (rear-surface fixing device) 55 is disposed on a rear part of the back plate part 45 of the seat part 40. The fixing device 55 is joined to the sliding member 55 through the elongate hole 46. Namely, in an arrangement where the back plate part 45 is sandwiched between the sliding member 60 and the fixing device 55, the sliding member 60 is disposed slidably with respect to the back plate part 45 of the seat part 40 by means of the fixing device 55.

Figure 2:
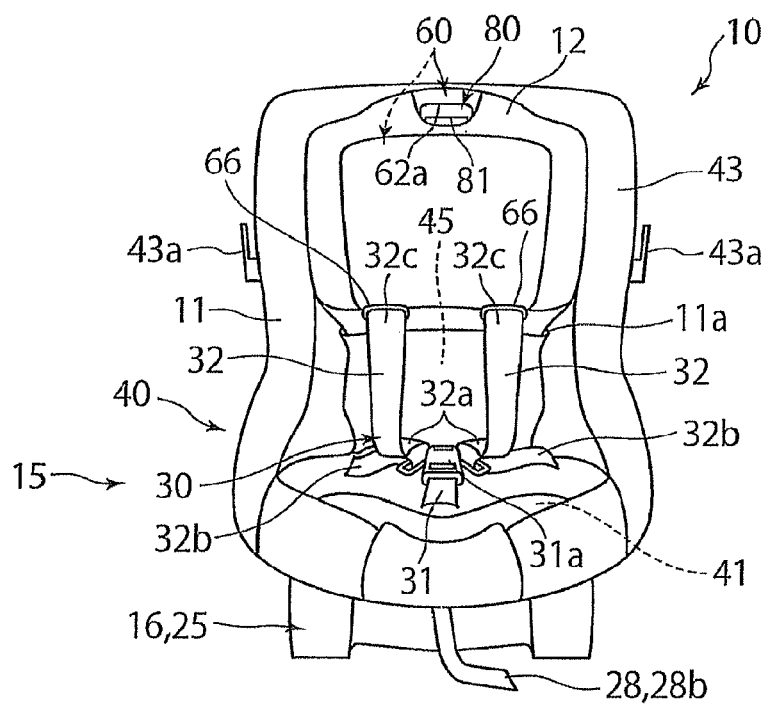
FIG. 2 is a front view showing the child car seat in FIG. 1, with the headrest being lowered.

In addition, a cover member 11 for seat part is removably arranged on the seat part 40 of the child-car-seat body 15, and a cover member 12 for headrest is removably arranged on the sliding member 60. As shown in FIGS. 1 and 2, the cover member 11 for seat part has an opening 11a at a position of the cover member 11 for seat part opposed to the back plate part 45 from the front side. The sliding member 60 is located through the opening 11a. At a position of the cover member 12 for headrest opposed to the through-hole 66 of the sliding member 60, a hole through which the child belt 30 can be inserted is formed. The cover member 11 for seat part and the cover member 12 for headrest are shown only in FIGS. 1 to 3, and illustration thereof is omitted in the other drawings.

The respective constituent elements constituting the child car seat 10 are described in detail below. As shown in the attached drawings, the child car seat 10 in this embodiment has a substantially symmetrical structure as a whole, about a surface along the back and front direction (laterally central surface) which passes a center of the width direction (lateral direction).

The child-car-seat body 15 is described at first. As shown in FIGS. 1 to 5, the child-car-seat body 15 includes the seat part (seat body) 40 having the seat plate part 41 and the back plate part 45, and a base 16 fixed on the seat part 40, the seat part 40 is a place on which a child is seated. On the other hand, when the child car seat 10 is set on the seat 5 of a vehicle, the base 16 is located between the seat part 40 on which a child is seated, and the seat 5 of the vehicle, such that the base 16 is in contact with the seat 5.

Figure 3:
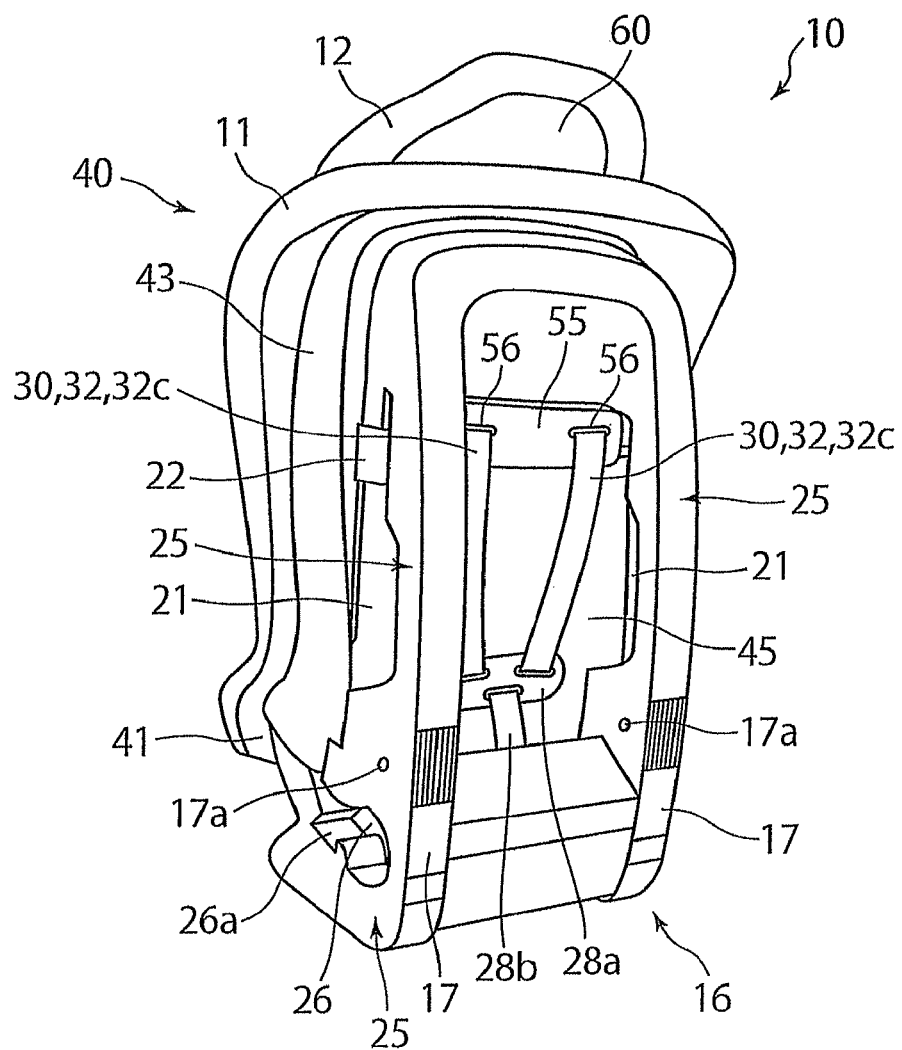
FIG. 3 is a perspective view showing the child car seat in FIG. 1 from behind, with the headrest being raised.

The base 16 includes a rear base 20 positioned behind the seat part 40, and a lower base 25 positioned below the seat part 40. As shown in FIG. 3, there are provided a pair of the rear bases 20 that are spaced apart from each other in the width direction. Each rear base 20 has a rear base through-hole 21 extending substantially in the up and down direction. A belt gripper 22 for gripping a vehicle seatbelt 7 is disposed above each through-hole 21. Below the through-hole 21, there is formed a belt leading part 21a structured as a groove for leading the vehicle seatbelt 7. On the other hand, in the lower base 25, there are formed a pair of the belt leading parts 26a structured as grooves for leading the vehicle seatbelt 7, such that the pair of belt leading parts 26a are spaced apart from each other in the width direction.

The vehicle seatbelt 7 is a seatbelt of a so-called three-point type, including a shoulder belt 7a extending from a shoulder on one side (e.g., right side) to a waist on the other side (e.g., left side), and a waist belt 7b extending from the waist on one side to the waist on the other side. The seatbelt 7 further includes a buckle 7c, which is inserted through one belt-like member to bend the one belt-like member so as to define the shoulder belt 7a and the waist belt 7b, and a receiving buckle 7d disposed on the other side of the seat 5. By locking the buckle 7c on the receiving buckle 7d, the body of a person seated on the seat 5 can be fixed on the seat 5.

As shown in FIG. 4, when the child car seat 10 is mounted in the forward-facing condition on the seat 5 of the vehicle, the shoulder belt 7a of the vehicle seatbelt 7 is supported by the belt leading part 21a on one side, while the shoulder belt 7a being gripped by the belt gripper 22 on the other side (e.g., left side). The waist belt 7b is supported by the belt leading parts 21a on both sides. Under this condition, the buckle 7c is fastened on the receiving buckle 7d. On the other hand, as shown in FIG. 5, when the child car seat 10 is mounted in the rearward-facing condition on the seat 5 of the vehicle, the shoulder belt 7a and the waist belt 7b of the vehicle seatbelt 7 are supported by the belt leading parts 26a on both sides. Under this condition, the buckle 7c is fastened on the receiving buckle 7d. A side plate part 43 of the seat part 40, which will be described later, is provided with a belt leading device 43a that receives the shoulder belt 7a. When the child car seat 10 is mounted in the rearward-facing condition on the seat 5 of the vehicle, the shoulder belt 7a of the vehicle seatbelt 7 is folded back by the belt leading device 43a on one side and is then held on the leading part 26a on one side.

As well shown in FIGS. 3 and 5, an auxiliary support piece 17 is disposed below each rear base 20, such that the auxiliary support piece 17 can be swung about a swing axis 17a. As shown in FIG. 5, when the child car seat 10 is mounted in the rearward-facing condition on the seat 5 of the vehicle, an inclination angle of the child car seat 10 is adjusted by using the auxiliary support piece 17 that is swung to extend from the rear base 20. On the other hand, as shown in FIG. 4, when the child car seat is mounted in the forward-facing condition on the seat 5 of the vehicle, the auxiliary support piece 17 is not used. At this time, the auxiliary support piece 17 is accommodated in the base 16 so as not to protrude from the rear base 20 and the lower base 25.

When the auxiliary support piece 17 is housed in the rear base 20 and the lower base 25, the auxiliary support piece 17 is positioned in a lower-base through-hole 26 which is used for fixing the child car seat 10 in the rearward-facing condition. Thus, if one fails to deploy the auxiliary support piece 17 when the child car seat 10 is mounted in the rear-ward facing condition in the seat 5 of the vehicle, a part of the lower-base through-hole 26, through which the buckle 7c of the vehicle seatbelt 7 should passes, is closed by the auxiliary support piece 17, which shown in FIG. 4. Thus, when the child car seat 10 is fixed in the rearward-facing condition, the failure in using the auxiliary support piece 17 can be effectively prevented, and the adequate use of the auxiliary support piece 17 is promoted.

Next, the seat part 40 is described. The seat part 40 is a member that is disposed on the base 16 so as to receive a child thereon. The seat part 40 includes the seat plate part (seat part, buttock part) 41 that receives buttocks of a child, the back plate part (back part) 45 that stands up from a rear part of the seat plate part 41 for receiving a back of the child, and the side plate parts (side parts) 43 disposed on both sides of the back plate part 41 and the rear plate part 45. The side plate parts 43 support a child seated on the child car seat 10 from the lateral sides. The belt leading devices 43a for leading the vehicle seatbelt 7 are disposed on both sides of each side plate part 43.

Figure 8:
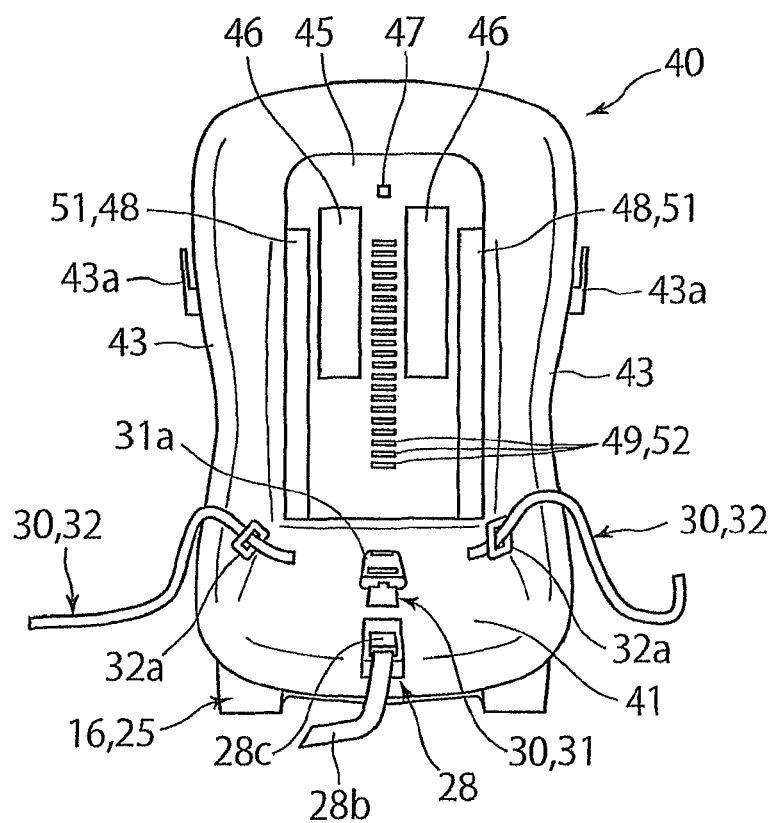
FIG. 8 is a front view showing the child car seat shown in FIGS. 6 and 7, from which the sliding member is removed.

As shown in FIG. 8, the back plate part 45 located behind the sliding member 60 includes a pair of fixed rail members 48 that are spaced apart from each other in the width direction. The pair of rail members 48 are arranged in parallel with each other. On the back plate part 45, each rail member 48 extends along the longitudinal direction of the back plate part 45, in other words, along a direction perpendicular to the width direction. The rail member 48 is arranged to be slidable with respect to the sliding member 60. Thus, the back plate part 45 of the seat part 40 is slidably joined to the sliding member 60 through the rail members 48 fixed on the back plate part 45.

Figure 11:
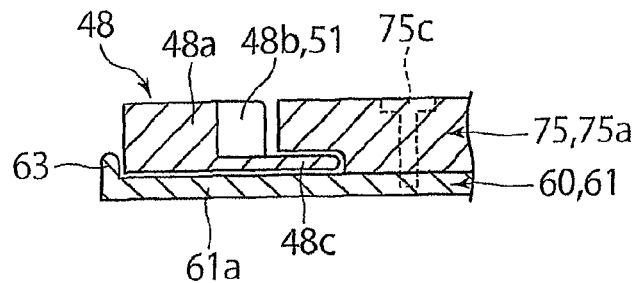
FIG. 11 is a sectional view showing a section taken along the line XI-XI of FIG. 9.

As well shown in FIG. 11, each rail member 48 includes an elongated rail-member body 48a and a flange part 48c extending from the rail-member body 48a to the inside in the width direction. The flange part 48c extends in the longitudinal direction of the rail-member body 48a. In the rail-member body 48a, recesses 48b opened toward the inside in the width direction are continuously formed in the longitudinal direction of the rail member 48. In this embodiment, a number of recesses 48b constitute the first engagement part 51 which can restrict the sliding movement of the sliding member 60, by being engaged with the first engagement piece 71 disposed on the sliding member 60.

In addition, in the back plate part 45 of the seat part 40, there are formed a pair of the elongate holes 46 that are spaced apart from each other in the width direction. As shown in FIG. 8, each elongate hole 46 extends along the sliding direction of the sliding member 60 with respect to the back plate part 45, i.e., along the longitudinal direction of the rail member 48. As long as the sliding member 60 is located on any position within the slidable range, the elongate holes 46 are adapted to be opposed to the through-holes 66 of the sliding member 60. Thus, irrespective of a position of the sliding member 60 with respect to the seat part 40, the child belt 30 can pass through both the through-holes 66 of the sliding member 60 and the elongate holes 46 of the back plate part 45.

As shown in FIG. 8, between the pair of elongate holes 46 in the width direction, there is formed a rugged part (patterned raised part) along the sliding direction of the sliding member 60 with respect to the back plate part 45, i.e., along the longitudinal direction of the rail member 48. The rugged part is formed by a number of locking projections 49 that are arranged along the sliding direction of the sliding member 60 with respect to the back plate part 45. The respective locking projections 49 extending in the width direction are arranged at predetermined pitches therebetween in the sliding direction of the sliding member 60 with respect to the back plate part 45. In this embodiment, the rugged part defined by the plurality of locking projections 49 constitutes the second engagement part 52 which can restrict the sliding movement of the sliding member 60, by being engaged with the second engagement piece 72 disposed on the sliding member 60.

In addition, as shown in FIG. 8, the back plate part 45 has a forwardly projecting escape prevention piece 47 having an enlarged head. The escape prevention piece 47 is engaged with a below-described leading elongate hole 62b of the sliding member 60, so as to prevent that the sliding member 60 is disengaged from the back plate part 45. The leading elongate hole 62b of the sliding member 60 extends along the sliding direction of the sliding member 60 with respect to the back plate part 45. A width of the leading elongate hole 62b is smaller than a width of the head of the escape prevention piece 47. By passing the escape prevention piece 47 of the back plate part 45 through the leading elongate hole 62b of the sliding member 60, a relative movement in the width direction of the sliding member 60 with respect to the seat part 40 is restricted. In addition, since the head of the escape prevention piece 47 is located ahead the sliding member 60, the sliding member 60 is restricted to move forward away from the seat part 40. Namely, owing to the escape prevention piece 47, the relative movement of the sliding member 60 with respect to the seat part 40 can be restricted only to the sliding movement in the intended sliding direction.

Figure 7:
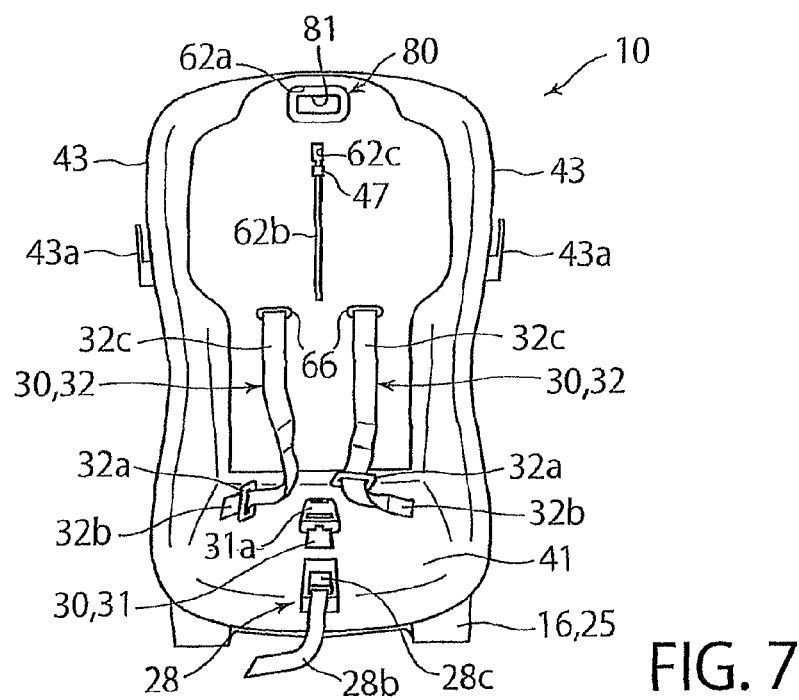
FIG. 7 is a front view showing the child car seat in FIG. 1 from which the cover member is removed, with the sliding member constituting the headrest being lowered.
Figure 9:
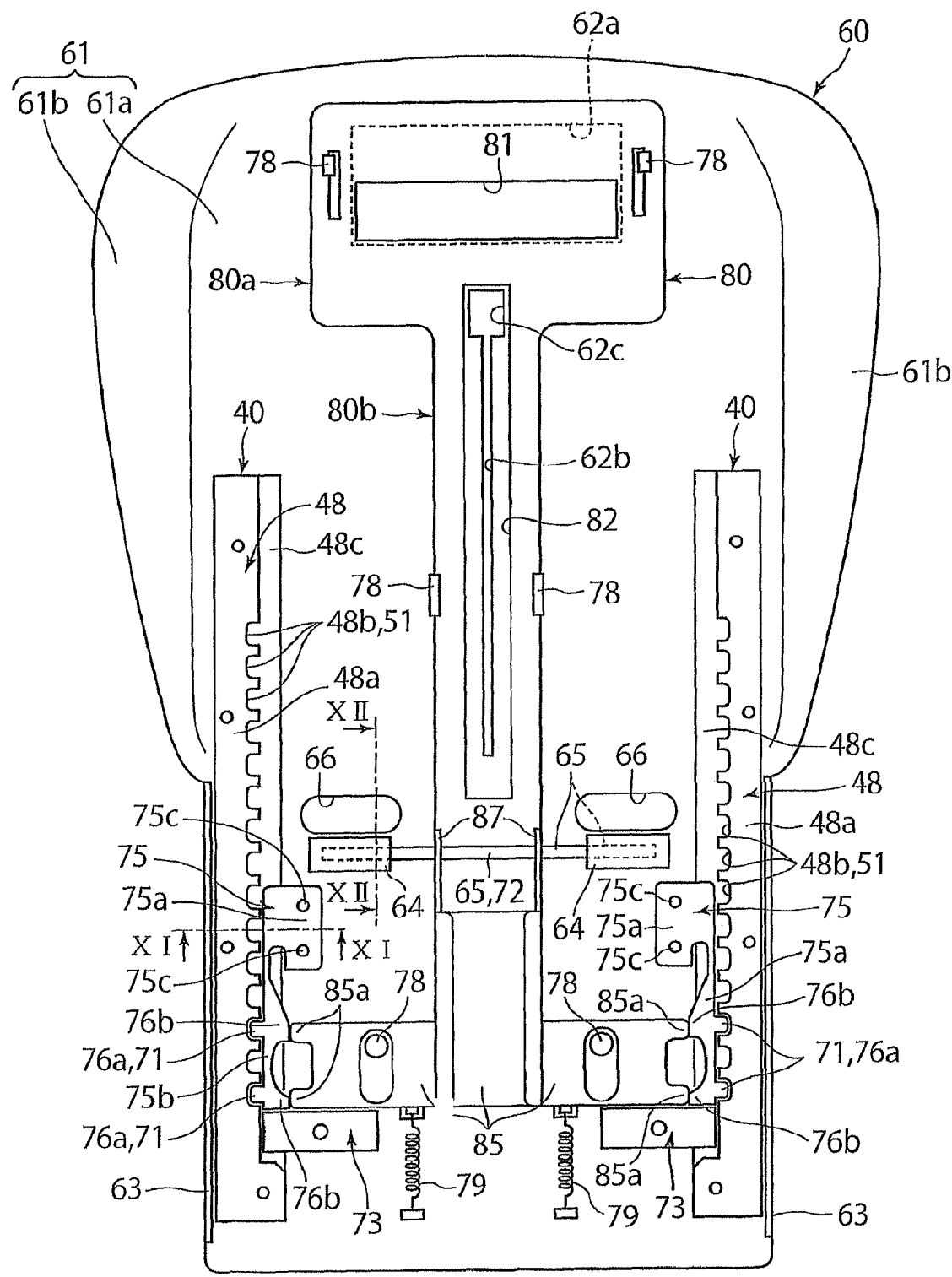
FIG. 9 is a plan view showing the sliding member and an operation member disposed on the sliding member from behind.

For example, as shown in FIG. 9, an end hole 62c is formed in an upper end of the leading elongate hole 62b of the sliding member 60. A width of the end hole 62 is larger than that of the leading elongate hole 62b. In this embodiment, as shown in FIG. 7, even when the sliding member 60 is moved to the lowest position with respect to the back plate part 45, the escape prevention piece 47 can be engaged with the leading elongate hole 62b. Meanwhile, the escape prevention piece 47 is located on a position near to the end hole 62c. Thus, the child car seat 10 can be assembled in the following manner. That is to say, before the escape prevention piece 47 is fixed on the back plate part 45, the sliding member 60 is mounted on the seat part 40. Thereafter, the escape prevention piece 47 is fixed on the back plate part 45 such that the escape prevention piece 47 is engaged with the leading elongate hole 62b through the wider end hole 62c.

Next, the child belt 30 is described. As described above, the child car seat 10 herein described is fixed on the seat 5 of the vehicle by the seatbelt 7 of the vehicle, and a body of a child seated on the child car seat 10 is fixed thereon by the dedicated child belt 30. As shown in FIG. 8, for example, the child belt 30 is disposed on the seat part 40. The child belt 30 may be structured as a belt of a three-point type including a crotch belt and shoulder belts, or as a belt of a five-point type including a crotch belt, a waist belt and shoulder belts. Herein, as illustrated, the child belt 30 structured as a belt of a five-point type is described.

As well shown in FIG. 8, the child belt 30 includes a first belt 31 functioning as a crotch belt, and a second belt 32 functioning as waist belts 32b and shoulder belts 32c. One end of the first belt 31 is fixed on substantially a center of the seat plate part 41, and a first buckle 31a is disposed on the other end of the first belt 31. On the other hand, there are provided a pair of the second belts 32 that are spaced apart from each other in the width direction, with one end of each second belt 32 being fixed on the seat plate part 41. Alternatively, the second belts 32 shown in FIG. 8 may be joined to each other in the inside of the seat plate part 41 or on the rear side thereof. Each second belt 32 extends through a second buckle 32a. As shown in FIGS. 1 and 2, the second belt 32 is folded up (turned up) by the second buckle 32a so as to define the waist belt 32b and the shoulder belt 32c.

As shown in FIGS. 1 to 3, 6 and 7, an end of the second belt 32 on the side of the shoulder belt 32c passes through the through-hole 66 of the sliding member 60 and the elongate hole 46 of the back plate part 45 so as to be joined to a belt-length adjusting mechanism 28. As shown in FIGS. 3 and 8, the belt-length adjusting mechanism 28 incudes a connection attachment 28a on which the shoulder belt 32 is fixed, an adjusting belt 28b joined to the connection attachment 28a and an adjusting belt chuck 28c disposed on the front part of the seat plate part 41. The adjusting belt chuck 28c openably grips the adjusting belt 28b. By varying the position at which the adjusting belt 28b is gripped by the adjusting belt chuck 28c, the lengths of the waist belt 32b and the shoulder belt 32c which are parts of the second belt 32 can be adjusted.

Due to the child belt 30, a child seated on the child car seat 10 can be fixed on the child car seat 10, by adjusting the lengths of the waist belt 32b and the shoulder belt 32c by means of the belt-length adjusting mechanism 28, and by locking the second buckle 32a by the first buckle 31a.

Next, the sliding member 60 is described in detail. The sliding member 60 includes a body plate 61 opposed to the seat part 40 from the front side, a fixed member 73 and a swinging member 75 which are disposed on the body plate 61. As described above, the sliding member 60 does not only support the shoulder belts 32c of the child belt 30 but also functions as a headrest covered with the cover member 12 for headrest. Between the body plate 61 and the seat part 40, there is provided the operation member 80 slidably supported on the sliding member 60.

As shown in FIG. 9, the body plate 61 includes a back part 61a located on a position opposed to the back plate part 45 of the seat part 40, and a pair of side parts 61b disposed on both lateral sides of the back part 61a on positions opposed to the side plate parts 43 of the seat part 40. The aforementioned through-holes 66, the leading elongate hole 62bc and the end hole 62c are formed in the back part 61a of the body plate 61. As well shown in FIG. 9, in this embodiment, a pair of the through-holes 66 are formed on positions that are spaced apart from each other in the width direction. In addition, at a position near to an upper end of the back part 61a of the body plate 61, there is formed an exposure hole 62a from which the operation member 80 is exposed. As shown in FIGS. 1 and 2, the cover member 12 for headrest is formed to expose the exposure hole 62a.

Figure 10:
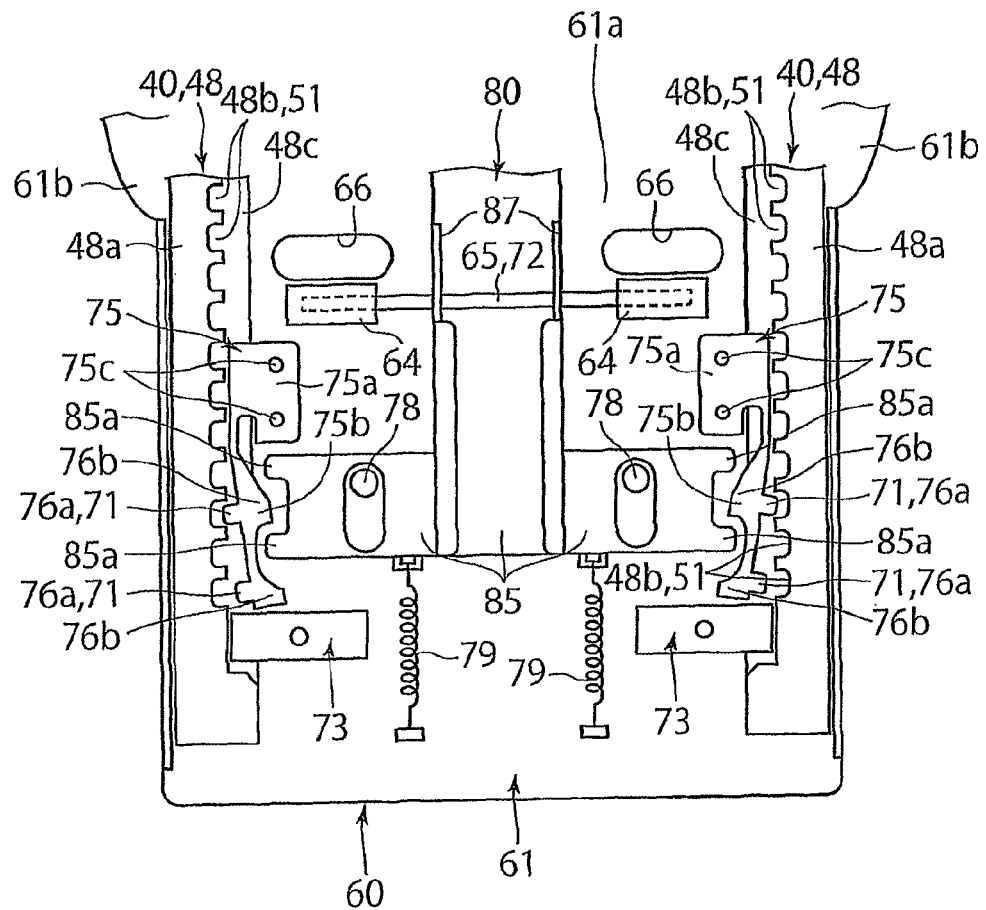
FIG. 10 is a plan view showing the sliding member and the operation member, in which the operation member is moved from the condition shown in FIG. 9.

As shown in FIGS. 9 to 11, in a lower area of the back part 61a of the body plate 61, there are formed a pair of guide projections 63 that are spaced apart from each other in the width direction. The respective guide projections 63a extend along both side edges of the back part 61 in the width direction, in the sliding direction of the sliding member 60 with respect to the back plate part 45. The guide projection 63 protrudes rearward from the body plate 61, i.e., toward the side of the back plate part 45 of the seat part 40. Each guide projection 63 comes into contact with the rail member 48 located on a predetermined position with respect to the sliding member 60 from the outside in the width direction, so as to guide the sliding movement of the sliding member 60 with respect to the back plate part 45 of the seat part 40 on which the rail member 48 is fixed.

As shown in FIGS. 9 and 10, a pair of the swinging members 75 spaced apart from each other in the width direction are attached to a surface of the back part 61a of the body plate 61 facing to the back plate part 45. Each swinging member 75 includes a fixed part 75a that is fixed on the back part 61a by means of an attachment member 75c such as a screw, and a swinging part 75b extending from the fixed part 75a. As shown in FIGS. 9 to 11, each swinging member 75 is located on a position opposed to the rail member 48 from the inside in the width direction.

The swinging part 75b is swingable with respect to the fixed part 75a fixed to the body plate 61. Each swinging part 75b can be moved between a position at which the swinging member 75b is located outward in the width direction so as to be in contact with the rail member 48, and a position at which the swinging member 75b is located inward in the width direction so as to be distant from the rail member 48. In this embodiment, the swinging movement of each swinging part 75b is achieved as a resilient deformation with respect to the fixed part 75a. In the illustrated example, the swinging part 75b, can be located on an inward position in the width direction, which is shown in FIG. 9, when no external force is applied thereto, and can be located on a position at which the swinging part 75b is in contact with and engaged with the rail member 48 when an external force is applied thereto.

As shown in FIGS. 9 and 10, the swinging part 75b has an engagement projection 76a protruding outward in the width direction, and an opposite projection 76b protruding inward in the width direction. The two engagement projections 76a are disposed in the sliding direction of the sliding member 60 with respect to the back plate part 45. The two opposite projections 76b are disposed in the sliding direction of the sliding member 60 with respect to the back plate part 45. The opposite projections 76b are engaged with the operation member 80 which is described in detail below.

As shown in FIG. 9, the engagement projection 76a has a shape that can be engaged with the recess 48b of the rail member 48 so as to be fitted in the recess 48b. When the swinging part 75b is resiliently deformed with respect to the fixed part 75a so as to be moved outward in the width direction, the engagement projection 76a is fitted in the recess 48b of the rail member 48, so that the sliding movement of the sliding member 60 with respect to the back plate part 45 on which the rail member 48 is fixed is restricted. Namely, in this embodiment, the engagement projection 76a of the swinging member 75 constitutes the first engagement piece 71 capable of restricting the sliding movement of the sliding member 60, by being engaged with the first engagement part 51 formed of a lot of recesses 48b. In such a structure, the direction in which the first engagement part 51 and the first engagement piece 71 are engaged with each other is perpendicular to the sliding direction to be restricted of the sliding member 60 with respect to the back plate part 45. Thus, by means of the engagement between the first engagement part 51 and the first engagement piece 71, the sliding movement of the sliding member 60 with respect to the back plate part 45 can be stably restricted.

As shown in FIG. 11, the fixed part 75a of each swinging member 75 is located such that the fixed part 75a covers the flange part 48c of the rail member 48 and that the fixed part 75a is opposed to the flange part 48c from the inside in the width direction. As a result, the rail member 48 fixed on the back plate part 45 is held on the sliding member 60 by the fixed part 75a of the swinging member 75 and the aforementioned guide projection 63, in such a manner that the rail member 48 can be slid only in the predetermined sliding direction with respect to the sliding member 60.

As shown in FIGS. 9 and 10, on a surface of the back part 61a of the body plate 61 opposed to the back plate part 45, there are also provided the pair of fixed members 73 that are spaced apart from each other in the width direction. Similarly to the fixed part 75a of the swinging member 75, the fixed member 73 is located such that the fixed member 73 covers the flange part 48c of the rail member 48 and that the fixed member 73 is opposed to the flange part 48c from the inside in the width direction. Thus, the rail member 48 fixed on the back plate part 45 is held on the sliding member 60 not only by the guide projection 63 and the fixed part 75a of the swinging member 75 but also by the fixed member 73. In addition, the rail member 48 can be slid only in the predetermined sliding direction with respect to the sliding member 60. According to such an embodiment, by means of the two members 73, 75 that are spaced apart from each other in the sliding direction of the sliding member with respect to the back plate part 45, and the guide projections 63 extending in the sliding direction of the sliding member 60 with respect to the back plate part 45, the relative rearward movement of the rail member 48 with respect to the sliding member 60, and the relative widthwise movement of the rail member 48 with respect to the sliding member 60 can be restricted significantly stably. Simultaneously, the sliding movement of the rail member 48 with respect to the sliding member 60 can be significantly smoothened.

As shown in FIGS. 9 and 10, on the back part 61a of the body plate 61, there are formed a pair of projecting support parts 64 that are spaced apart from each other in the width direction. As shown in FIGS. 9 and 10, each projecting support part 64 is located near to the through-hole 66. As well shown in FIG. 14, the projecting support part 64 extends rearward from the body plate 61 through the elongate hole 46 up to the rear part of the back plate part 45. Between the pair of projecting support parts 64, there are supported a fixed pin 59 extending in the width direction and an engagement pin 65 extending in the width direction. The fixed pin 59 constitutes a part of the fixing device 55. The fixing device 55 is supported on a given position with respect to the sliding member 60, by support openings 64a of the projecting support parts 64.

Figure 12:
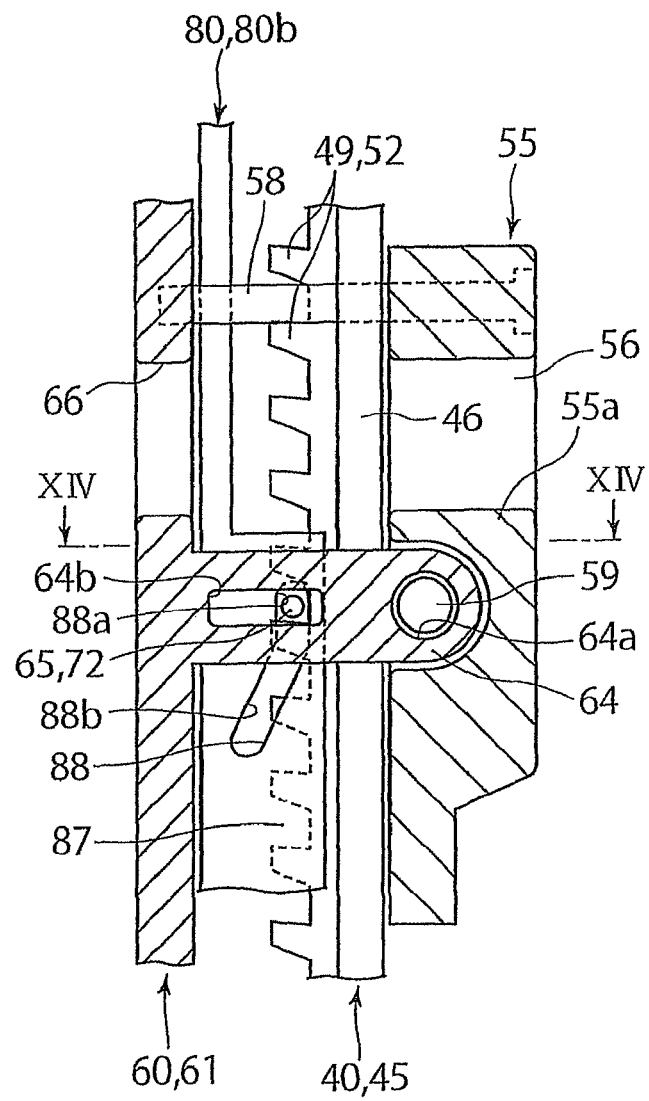
FIG. 12 is a partial longitudinal sectional view showing the child car seat at a position corresponding to the line of FIG. 9.
Figure 13:
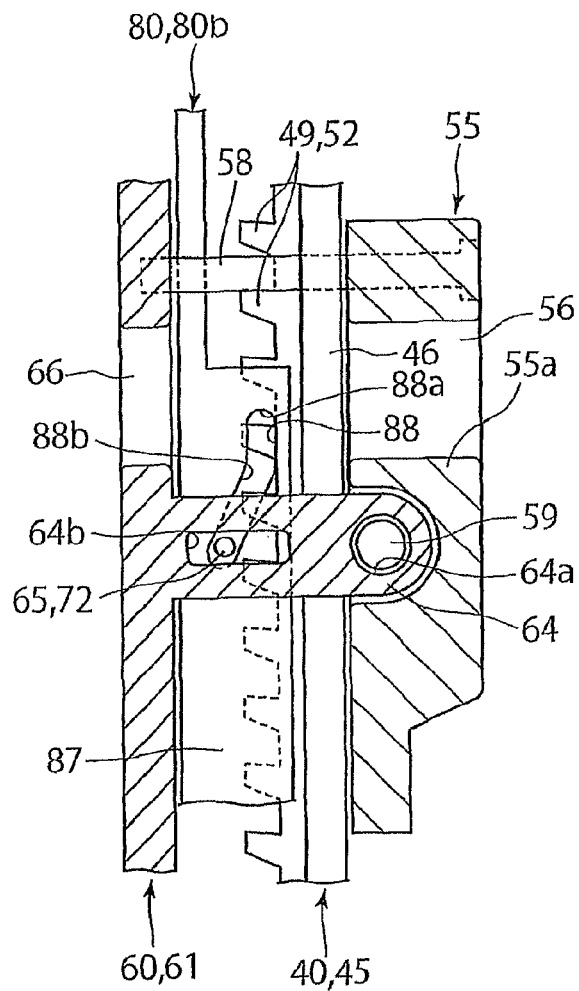
FIG. 13 is a partial longitudinal sectional view corresponding to FIG. 12, showing the child car seat in which the operation member is moved from the condition shown in FIG. 12.

On the other hand, the engagement pin 65 is located on a position opposed to the second engagement part 52 formed of the aforementioned locking projections 49. Each projecting support part 64 has an elongate leading support opening 64b extending toward the second engagement part 52. As shown in FIGS. 12 and 13, the locking projection 49 is supported in the leading support opening 64b, and can be moved closer to the second engagement part 52 and moved away from the second engagement part 52. As shown in FIG. 12, a thickness of the engagement pin 65 is set such that the engagement pin 65 can be fitted in a space between the adjacent two locking projections 49.

Due to the operation by the below-described operation member 80, when the engagement pin 65 is brought closer to the back plate part 45, the engagement pin 65 is fitted in the space between the two locking projections 49, so that the sliding movement of the sliding member 60 with respect to the back plate part 45 on which the locking projections 49 are formed is restricted. Namely, in this embodiment, the engagement pin 65 supported on the sliding member 60 constitutes the second engagement piece 72 capable of restricting the sliding movement of the sliding member 60, by being engaged with the second engagement part 52 formed of a lot of locking projections 49.

In such a structure, the direction in which the second engagement part 52 and the second engagement piece 72 are engaged with each other is perpendicular to the sliding direction to be restricted of the sliding member 60 with respect to the back plate part 45. Thus, by means of the engagement between the second engagement part 52 and the second engagement piece 72, it is possible to stably restrict the sliding movement of the sliding member 60 with respect to the back plate part 45. In addition, in this child car seat 10, in order to enable the sliding movement of the sliding member 60 with respect to the back plate part 45, it is necessary to release not only the engagement between the first engagement part 51 and the first engagement piece 71 but also the engagement between the second engagement part 52 and the second engagement piece 72. Thus, an unintended sliding movement of the siding member 60 with respect to the back plate part 45 can be effectively prevented.

Next, the fixing device 55 is described. As described above, the sliding member 60 is disposed in front of the back plate part 45 of the seat part 40. On the other hand, as shown in FIG. 3, the fixing device 55 is disposed behind the back plate part 45 of the seat part 40. The fixing device 55 is joined to the sliding member 60 through the elongate holes 46 of the back plate part 45, such that the back plate part 45 is sandwiched between the fixing device 55 and the sliding member 60. The fixing device 55 can be slid, together with the sliding member 60, with respect to the back plate part 45 of the seat part 40.

Figure 14:
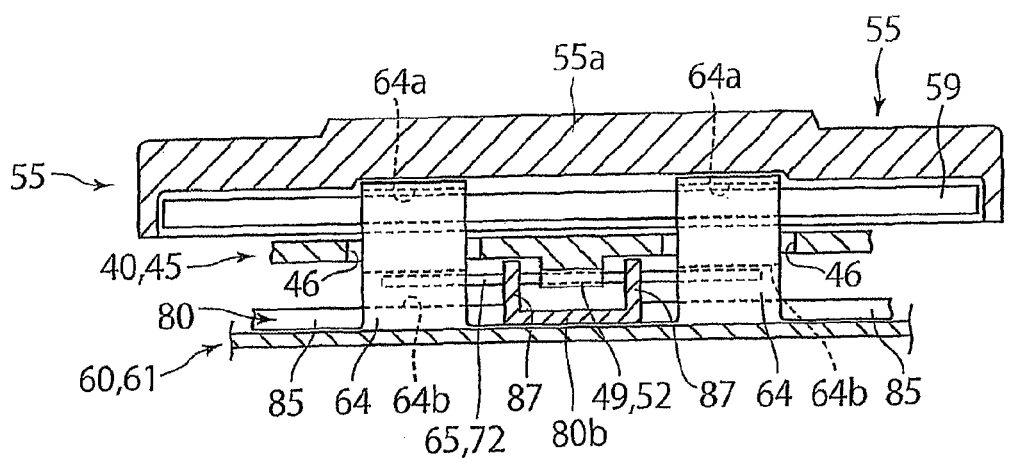
FIG. 14 is a sectional view showing a section along the line XIV-XIV of FIG. 12.

As shown in FIGS. 3 and 14, the fixing device 55 extends in the width direction, such that the fixing device 55 is opposed to both of the pair of through-holes 66 formed in the sliding member 60 and to both of the pair of elongate holes 46 formed in e back plate part 45 of the seat part 40. The fixing device 55 has a through-hole 56 through which the child belt 30 can pass, at a position opposed to the through-hole 66 of the sliding member 60. As shown in FIG. 3, in this embodiment, correspondingly to the pair of through-holes 66, there are provided a pair of the through-holes 56 that are spaced apart from each other in the width direction. Namely, in this embodiment, irrespective of the position of the sliding member 60, the shoulder belts 32c of the child belt 30 extend through the through-holes 66 of the sliding member 60, the elongate holes 46 of the back plate part 45 of the seat part 40, and the through-holes 56 of the fixing device 55.

As shown in FIGS. 12 to 14, the fixing device 55 includes a casing 55a, a connection device 58 connecting the casing 55a and the sliding member 60, and the aforementioned fixed pin 59. There are provided a pair of the fixing devices 58 that are spaced apart from each other in the width direction. Each connection device 58 extends between the casing 55a and the back part 61a of the body plate 61 of the sliding member 60 through the corresponding elongate hole 46. Namely, the casing 55a extends in the width direction so as to be opposed to both of the pair of elongate holes 46, and is joined to the sliding member 60 through both of the pair of elongate holes 46. As well shown in FIG. 14, similarly to the casing 55a, the above-described fixed pin 59 extends in the width direction so as to be opposed to both of the pair of elongate holes 46, and is joined to the sliding member 60 through both of the pair of elongate holes 46. The fixed pin 59 is accommodated in the casing 55a. In addition, as shown in FIG. 14, in this embodiment, the casing 55a and the fixed pin 59 of the fixing device 55 further extend outward of the pair of thorough-holes 56 in the width direction.

Namely, according to such an embodiment, by using the fixing device 55 (the casing 55a and the fixed pin 59) disposed behind the back plate part 45, which is not in contact with a child seated on the child car seat 10, it is possible to support the sliding member 60 slidably with respect to the back plate part 45 significantly stably. Further, due to the fixing device including the casing 55a and the fixed pin 59, an unintentional movement (displacement) of the sliding member 60 with respect to the back plate part 45 both in the back and front direction and in the width direction can be effectively prevented, whereby an intentional sliding movement of the sliding member 60 with respect to the back plate part 45 can be realized significantly smoothly.

Next, the operation member 80 is described. The operation member 80 is supported by a plurality of fasteners 78 disposed on the sliding member 60, on a surface of the sliding member 60 opposed to the back plate part 45. The operation member 80 can be slid with respect to the sliding member 60. Particularly in this embodiment, the sliding direction of the operation member 80 with respect to the sliding member 60 is in parallel with the sliding direction of the sliding member 60 with respect to the back plate part 45. An urging member 79 (in the illustrated example, e.g., a tension spring) is provided between the operation member 80 and the sliding member 60, such that the operation member 80 is urged downward along the sliding direction.

In this embodiment, as shown in FIG. 9, the operation member 80 is composed of an operation part 80a located on a position opposed to the exposure opening 62a formed in the body plate 61 of the sliding member 60, an operation base 85 located on a position between the swinging parts 75b of the pair of swinging members 75, and a communication part (connection part) 80b extending between the operation part 80a and the operation base 85 along the sliding direction of the sliding member 60 with respect to the back plate part 45. As shown in FIG. 9, the communication part 80b extends along the sliding direction of the sliding member 60 with respect to the back plate part 45 on a widthwise position between the pair of elongate holes 46, in other words, on a position opposed to the second engagement part 52 formed of the locking projections 49. As shown in FIG. 9, when no external force is applied, the operation member 80 is urged downward by the urging member 79 to a position at which the operation base 85 is in contact with the fixed members 73 of the sliding member 60.

The operation part 80a of the operation member 80 has a gripping part 81 at a position opposed to the exposure hole 62a of the sliding member 60. In the illustrated example, the gripping part 81 is formed as a through-hole. However, not limited thereto, the gripping part 81 may be structured as various shapes such as a groove or a ridge. In addition, the operation member 80 is provided with an exposure elongate hole 82 at a position opposed to the leading elongate hole 62b and the end hole 62c of the sliding member 60. The leading elongate hole 62b and the end hole 62c are exposed to the back plate part 45 by the exposure elongate hole 82, so that the aforementioned engagement between the escape prevention piece 47 and the leading elongate hole 62b is enabled.

As shown in FIGS. 9 and 10, an operation projection 85a protruding outward in the width direction is disposed on each widthwise outer periphery of the operation base 85. On each widthwise outer periphery of the operation base 85, there are disposed the two operation projections 85a that are spaced apart from each other in the sliding direction of the sliding member 60 with respect to the back plate part 45. The two operation projections 85a arranged on one side in the width direction can be engaged with the two opposite projections 76b disposed on the swinging part 75b of the corresponding swinging member 75. In this embodiment, the engagement between the first engagement part 51 and the first engagement piece 71 and the release of the engagement therebetween can be operated by means of the operation member 80, in the manner as described below.

As described above, when no external force is applied to the operation member 80, the operation base 85 is located on a position in contact with the fixed members 73 of the seat part 40, by the urging force from the urging member 79. As shown in FIG. 9, at this time, the operation projections 85a of the operation base 85 are engaged with the opposite projections 76b of the swinging part 75b. Due to this engagement, the swinging part 75b is resiliently deformed with respect to the fixed part 75a so as to be swung outward in the width direction. Thus, the engagement projections 76a of the swinging part 75b are fitted in the recesses 48b of the rail member 48. In this manner, the pair of swinging parts 75b are respectively moved outward in the width direction, so that the engagement projections 76a forming the first engagement piece 71 and the recesses 48b forming the first engagement part 51 are engaged with each other, whereby the sliding movement of the sliding member 60 with respect to the seat part 40 can be restricted.

At this time, the operation base 85 extending in the width direction is located between the pair of swinging parts 75b. Thus, even when an unintentional external force is applied to the sliding member 60, for example, it can be effectively prevented that the swinging parts 75b are swung inward in the width direction so that the engagement between the engagement projections 76a forming the first engagement piece 71 and the recesses 48b forming the first engagement part 51 is released.

On the other hand, as shown in FIG. 10, when the operation member 80 is slid upward, against the urging force of the urging member 79, with respect to the sliding member 60 along the direction of the sliding member 60 with respect to the back plate part 45, the operation projections 85a are moved upward along the sliding direction of the sliding member 60 with respect to the back plate part 45. As a result, as shown in FIG. 10, each operation projection 85a is shifted to a position that is not opposed to the opposite projection 76b of the swinging part 75 from the inside in the width direction. Thus, the swinging part 75b is swung inward in the width direction with respect to the fixed part 75a so as to be returned from the resilient deformation. As a result, the engagement projection 76a of the swinging part 75b is disengaged from the recess 48 of the rail member 48. In this manner, the engagement between the engagement projections 76a forming the first engagement piece 71 and the recesses 48b forming the first engagement part 51 can be released.

As shown in FIGS. 9, 10, 12 and 13, the communication part 80b of the operation member 80 is provided with a pair of standing plates 87 that are spaced apart from each other in the width direction and protrude toward the back plate part 45 of the seat part 40. As shown in FIGS. 12 and 13, the standing plate 87 has an operation hole 88 capable of being engaged with the engagement pin 65. As described above, the engagement pin 65 is supported by the projecting support part 64 such that the engagement pin 65 can be moved closer to and away from the second engagement part 52 formed on the back plate part 45. As shown in FIGS. 12 and 13, the engagement pin 65 is inserted through the operation hole 88 of the standing plate 87.

The standing plate 87 includes a straight hole 88a extending in parallel with the sliding direction of the sliding member 60 with respect to the back plate part 45, and an inclined hole 88b disposed below the straight hole 88 in the sliding direction of the sliding member 60 with respect to the back plate part 45. The inclined hole 88b is inclined with respect to the sliding direction of the sliding member 60 with respect to the back plate part 45. To be specific, as a certain point on the inclined hole 88b is moved downward in the sliding direction, the point on the inclined hole 88b moves away from the back plate part 45 to come close to the sliding member 60. In this embodiment, the engagement between the second engagement part 52 (locking projections 49) and the second engagement piece 72 (engagement pin 65) and the release of the engagement therebetween can be operated by using the operation member 80 in the manner as described below.

When the operation base 85 is located on a position in contact with the fixed members 73 of the seat part 40 by the urging force from the urging member 79, as shown in FIG. 12, the straight hole 88a of the operation hole 88 crosses the leading support opening 64b of the projecting support part 64. The straight hole 88a is formed on a position that is spaced apart from the sliding member 60 but close to the back plate part 45. Thus, the engagement pin 65 is located on a position fitted between the two adjacent locking projections 49. Namely, the engagement pin 65 forming the second engagement piece and the locking projections 49 forming the second engagement part 52 are engaged with each other, so that the sliding movement of the sliding member 60 with respect to the seat part 40 can be restricted.

The operation member 80 supporting the engagement pin 65 from the front side is supported by the sliding member 60. The forward movement of the sliding member 60 from the back plate part 45 is restricted by the fixing device 55. Thus, even when an unintentional external force is applied to the sliding member 60, for example, it can be effectively prevented that the engagement pin 65 escapes from the space between the two locking projections 49, so that the engagement between the engagement pin 65 forming the second engagement piece 72 and the locking projections 49 of the second engagement part 52 is released.

In the illustrated example, the locking projection 49 projects slightly upward from the seat part 40. In the actual use of the child car seat 10, the back plate part 45 of the seat part 40 is inclined from the vertical direction such that an upper end of the back plate part 45 is shifted rearward. Also from this structure, it can be effectively prevented that the engagement pin 65 unintentionally escapes from the space between the two locking projections 49.

On the other hand, when the operation member 80 is slid upward with respect to the sliding member 60 along the sliding direction of the sliding member 60 with respect to the back plate part 45, as shown in FIG. 13, the inclined hole 88b of the operation hole 88 crosses the leading support opening 64b of the projecting support part 64. As the inclined hole 88b extends downward, the inclined hole 88b comes close to the sliding member 60 and moves away from the back plate part 45. Thus, the engagement pin 65 is gradually spaced apart from the back plate part 45 of the seat part 40 so as to escape from the space between the two adjacent locking projections 49. In this manner, the engagement between the locking pin 65 forming the second engagement piece 72 and the locking projections 49 forming the second engagement part 52 is released.

As described above, in this embodiment, when no external force is applied, the operation member 80 is slid with respect to the sliding member 60 by the urging force from the urging member 79, so that the first engagement part 51 and the first engagement piece 71 are engaged with each other, and the second engagement part 52 and the second engagement piece 72 are engaged with each other. Thus, it can be effectively prevented that the sliding member 60 is unintentionally moved with respect to the seat part 40.

When the operation member 80 is slid, against the urging force from the urging member 79, upward with respect to the sliding member 60 along the sliding direction of the sliding member 60 with respect to the back plate part 45, the engagement between the first engagement part 51 and the first engagement piece 71 is released, and the engagement between the second engagement part 52 and the second engagement piece 72 is released. Thus, the sliding member 60 can be moved with respect to the seat part 40. In addition, in this embodiment, the operation direction of the operation member 80 with respect to the sliding member 60 corresponds to the sliding direction of the sliding member 60 with respect to the back plate part 45. Thus, directly by means of the force for operating the operation member 80 with respect to the sliding member 60, the sliding member 60 can be slid with respect to the back plate part 45.

Particularly in this embodiment, the orientation in which the operation member 80 is operated with respect to the sliding member 60 corresponds to the orientation in which the sliding member 60 is pulled upward with respect to the back plate part 45. Thus, directly by means of the force sliding the operation member 80 with respect to the sliding member 60, the sliding member 60 can be pulled upward against the gravity. Therefore, the upward pulling movement of the sliding member 60 can be performed significantly easily and smoothly.

In addition, as shown in FIG. 9, the exposure hole 62a is provided near to the upper end of the body plate 61. Thus, when the part between the upper end of the back part 61a of the body plate 61 and the exposure hole 62a, together with the gripping part 81 of the operation member 80, is gripped by an operator, the operator can operate the operation member 80 to enable the sliding movement of the sliding member 60 with respect to the back plate part 45. Namely, the sliding movement 60 can be easily moved upward and downward by one hand.

According to the embodiment as described above, by sliding the sliding member 60 with respect to the back plate part 45 of the seat part 40, a height position of the sliding member 60 can be varied. The sliding member 60 has the through-holes 66 for supporting the shoulder belts 32c of the child belt 30. Thus, by sliding the sliding member 60 with respect to the seat part 40, the support position of the shoulder belt 32c in the height direction can be easily adjusted depending on a size of a child seated on the child car seat 10. As compared with a conventional child car seat in which a support position of the shoulder belt is adjusted by suitably selecting one through-hole through which the shoulder belt should pass, from among three or four through-holes formed in different positions of the back part in the height direction, this embodiment is advantageous in that it is not necessary to detach the shoulder belt 32c from the connection attachment 28a of the belt-length adjusting mechanism 28, whereby an operation load can be remarkably reduced. In addition, in the conventional child car seat, it is impossible to form a number of through-holes in the back part, in consideration of the rigidity of the child car seat. Thus, in the conventional child car seat, the height position of the shoulder belt cannot be finely adjusted. On the other hand, according to this embodiment, by adjusting the arrangement pitch of the recesses 48b forming the first engagement part 51 and the arrangement pitch of the locking projections 49 forming the second engagement part 52, it is possible to finely adjust the support position of the child belt 30 in the height direction.

Further, according to this embodiment, the sliding member 60 is located on a potion opposed to the back plate part 45 of the seat part 40 from the front side. Thus, the slidable sliding member 60 for receiving a weight of a child seated on the child car seat from the front side can be supported significantly stably, by the back plate part 45 disposed behind the sliding member 60. In addition, since the sliding member 60 is located in front of the back plate part 45, the slidable range of the sliding member 60 can be elongated along the sliding direction. At any position within the long range, the sliding member 60 can be stably supported from behind by the back plate part 45. Furthermore, since the sliding member 60 is located in front of the back plate part 45, the sliding member 60 can be slidably, stably held with respect of the back plate part 45, by means of the fixing device 55 disposed behind the back plate part 45. In particular, an intentional movement (displacement) of the sliding member 60 with respect to the back plate part 45 in the back and front direction can be effectively prevented.

The aforementioned embodiment can be variously modified within the scope of the present invention. An modification example is described herebelow.

In the aforementioned embodiment, there are provided the pair of through-holes 66 of the sliding member 60, the pair of elongate holes 46 of the back plate part 45, the pair of through-holes 56 of the fixing device 55 all of which are spaced apart from each other in the width direction. However, at least one of the pair of through-holes 66 of the sliding member 60, the pair of elongate holes 46 of the back plate part 45, the pair of through-holes 56 of the fixing device 55 my be formed as one hole through which the pair of parts of the child belt 30 can pass.

In the aforementioned embodiment, although the concrete structures of the first engagement part 51, the second engagement part 52, the first engagement piece 71 and the second engagement piece 72 are described, the aforementioned structures are nothing more than an example and can be variously modified. For example, in the above example, the swinging part 75b of the swinging member 75 forming the first engagement piece 71 is resiliently deformed with respect to the fixed part 75 so as to be swung. However, not limited thereto, the swinging part 75b may be swingable with respect to the fixed part 75a through a swing shaft.

Further, in the aforementioned embodiment, both of the first engagement part 51 and the second engagement part 52 are disposed on the seat part 40, and both of the first engagement piece 71 engageable with the first engagement part 51 and the second engagement piece 72 engageable with the second engagement part 52 are disposed on the sliding member 60. However, at least one of the first engagement part 51 and the second engagement part 52 may be disposed on the sliding member 60, and at least one of the first engagement piece 71 and the second engagement piece 72 may be disposed on the seat part 40 correspondingly thereto.

Furthermore, in the aforementioned embodiment, there are provided the first engagement part 51 and the first engagement piece 71 which are engageable with each other, and the second engagement part 52 and the second engagement piece 72 which are engageable with each other. However, one of the first engagement part 51 and the first engagement piece 71, and the second engagement part 52 and the second engagement piece 72 may be omitted.

Still furthermore, in the aforementioned embodiment, the child-car-seat body 15 incudes the base 16 and the seat part 40 fixe on the base 16. However, the present invention is not limited thereto. The seat part 40 may be removable from the base 16, or the seat part 40 may be slid with respect to the base 16 so that the seat part 40 can be reclined. Moreover, the seat part 40 may be turned with respect to the base 16, so that the orientation of the seat part 40 can be varied.

What is claimed is:
1. A child car seat comprising:
a child-car-seat body including a seat part having a seat plate part and a back plate part;
a sliding member located on a position opposed to the back plate part from a front side, the sliding member being slidable with respect to the back plate part so as to move in a height direction; and
a child belt disposed on the child-car-seat body;
wherein:
the sliding member has a through-hole through which the child belt can pass;
the back plate part has, at a position opposed to the through-hole, an elongate hole extending in a sliding direction of the sliding member with respect to the back plate part, the elongate hole allowing the child belt, which has passed through the through hole of the sliding member, to pass therethrough;
a pair of first engagement parts that are spaced apart from each other in a width direction are disposed on the sliding member or the seat part, each engagement part extending in the sliding direction of the sliding member with respect to the back plate part, and a pair of first engagement pieces that are spaced apart from each other in the width direction are disposed on one of the sliding member and the seat part on which the first engagement parts are not disposed, the first engagement pieces being capable of moving away from each other and moving closer to each other;
a second engagement part extending in the sliding direction of the sliding member with respect to the back plate part is disposed on the sliding member or the seat part, and a second engagement piece is disposed, at a position opposed to the second engagement part, on one of the sliding member and the seat part on which the second engagement part is not disposed, the second engagement piece being supported to be capable of moving closer to and moving away from one of the sliding member and the seat part on which the second engagement part is disposed; and
a sliding movement of the sliding member with respect to the back plate part is enabled, by releasing an engagement between the first engagement piece and the first engagement part and by releasing an engagement between the second engagement piece and the second engagement part.

2. The child car seat according to claim 1, wherein
at least one of the through-hole and the elongate hole includes a pair of holes that are spaced apart from each other in a width direction.

3. The child car seat according to claim 1 further comprising a fixing device joined to the sliding member through the elongate hole of the back plate part, such that the back plate part is sandwiched between the fixing device and the sliding member,
wherein the fixing device is slidable, together with the sliding member, with respect to the back plate part.

4. The child car seat according to claim 3, wherein:
the elongate hole includes a pair of elongate holes that are spaced apart from, each other in a width direction; and
the fixing device extends in the width direction and is joined to the sliding member through both of the elongate holes.

5. The child car seat according to claim 1, wherein:
the pair of first engagement parts are disposed on the back plate part;
the pair of first engagement pieces are disposed on the sliding member; and
the pair of first engagement pieces are engaged with the first engagement parts located on positions opposed to the respective first engagement pieces from outside in the width direction, when the first engagement pieces are moved away from each other outward in the width direction.

6. The child car seat according to claim 1, wherein:
the elongate hole includes a pair of elongate holes disposed in the back plate part, the elongate holes being spaced apart from each other in a width direction; and
the second engagement part is located on a position between the pair of elongate holes of the back plate part in the width direction.

7. The child car seat according to claim 1, further comprising an operation member disposed on the sliding member, the operation member being slidable with respect to the sliding member along the sliding direction of the sliding member with respect to the back plate part,
wherein a sliding movement of the sliding member with respect to the back plate part is enabled, by sliding the operation member with respect to the sliding member.

8. The child car seat according to claim 7, wherein
the operation member is arranged between the sliding member and the back plate part, and the operation member has a gripping part exposed from the sliding member.

9. The child car seat according to claim 1 further comprising a cover member for seat to be set on the seat part,
wherein:
an opening is formed in the cover member for seat, at a position opposed to the back plate part from the front side; and
the sliding member is passed through the opening.

10. The child seat according to claim 7, wherein
the operation member is located on the sliding member, and the operation member has a gripping part exposed from the sliding member.

* * * * *